(12) United States Patent
Le Duy

(10) Patent No.: US 8,042,939 B2
(45) Date of Patent: Oct. 25, 2011

(54) EYEGLASS FRAME

(75) Inventor: Daniell Le Duy, Berlin (DE)

(73) Assignee: IC! Berlin Brillen GmbH, Berlin (DE)

( * ) Notice: Subject to any disclaimer, the term of this patent is extended or adjusted under 35 U.S.C. 154(b) by 84 days.

(21) Appl. No.: 12/580,431

(22) Filed: Oct. 16, 2009

(65) Prior Publication Data

US 2010/0033673 A1 Feb. 11, 2010

Related U.S. Application Data

(63) Continuation of application No. PCT/EP2008/003193, filed on Apr. 21, 2008.

(30) Foreign Application Priority Data

Apr. 20, 2007 (DE) .................. 20 2007 005 735 U

(51) Int. Cl.
   *G02C 5/22* (2006.01)
(52) U.S. Cl. .......................................... 351/153; 16/228
(58) Field of Classification Search ............... 351/153, 351/113, 116, 111, 41, 158; 16/228
   See application file for complete search history.

(56) References Cited

U.S. PATENT DOCUMENTS

| | | | |
|---|---|---|---|
| 3,155,982 A | | 11/1964 | Baratelli |
| 3,744,887 A | * | 7/1973 | Dunbar .......................... 351/153 |
| 7,543,931 B2 | | 6/2009 | Proksch |
| 7,645,040 B2 | * | 1/2010 | Habermann .................. 351/153 |
| 2008/0278677 A1 | | 11/2008 | Gottschling et al. |

FOREIGN PATENT DOCUMENTS

| | | |
|---|---|---|
| DE | 202004007224 | 7/2004 |
| DE | 102005019850 | 11/2006 |
| EP | 0863424 | 9/1998 |
| FR | 1009345 | 5/1952 |
| WO | 2005116727 | 12/2005 |

OTHER PUBLICATIONS

International Search Report dated Jul. 23, 2008 issued in related International Patent Application No. PCT/EP2008/003193.

* cited by examiner

*Primary Examiner* — Hung Dang
(74) *Attorney, Agent, or Firm* — Grossman Tucker Perreault & Pfleger, PLLC

(57) ABSTRACT

The present invention relates to an eyeglass frame having an earpiece each on the left and the right and having a frame comprising a receiving element each on the left and right for attaching the earpiece, wherein the receiving element has a recess opening in the direction toward the earpiece, a connecting element being located in said recess and comprising at least two individual components designed such that they captively hold the connecting element in the recess of the receiving element in the assembled state, forming the connecting element, by mutually tensioning the connecting element.

15 Claims, 5 Drawing Sheets

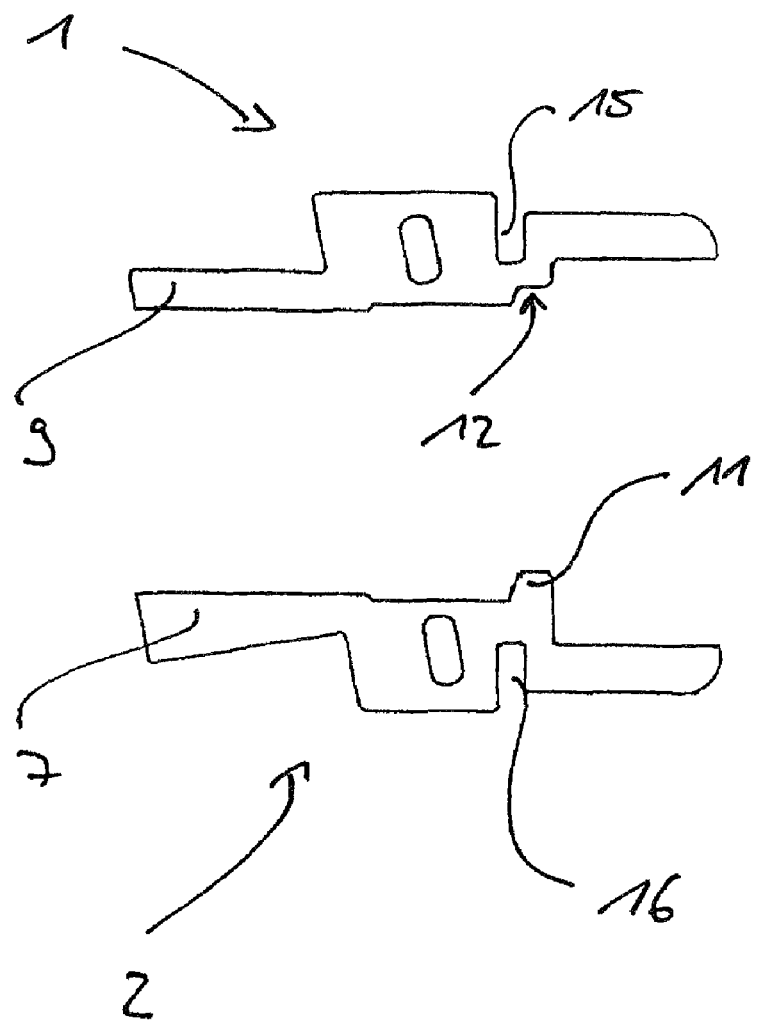

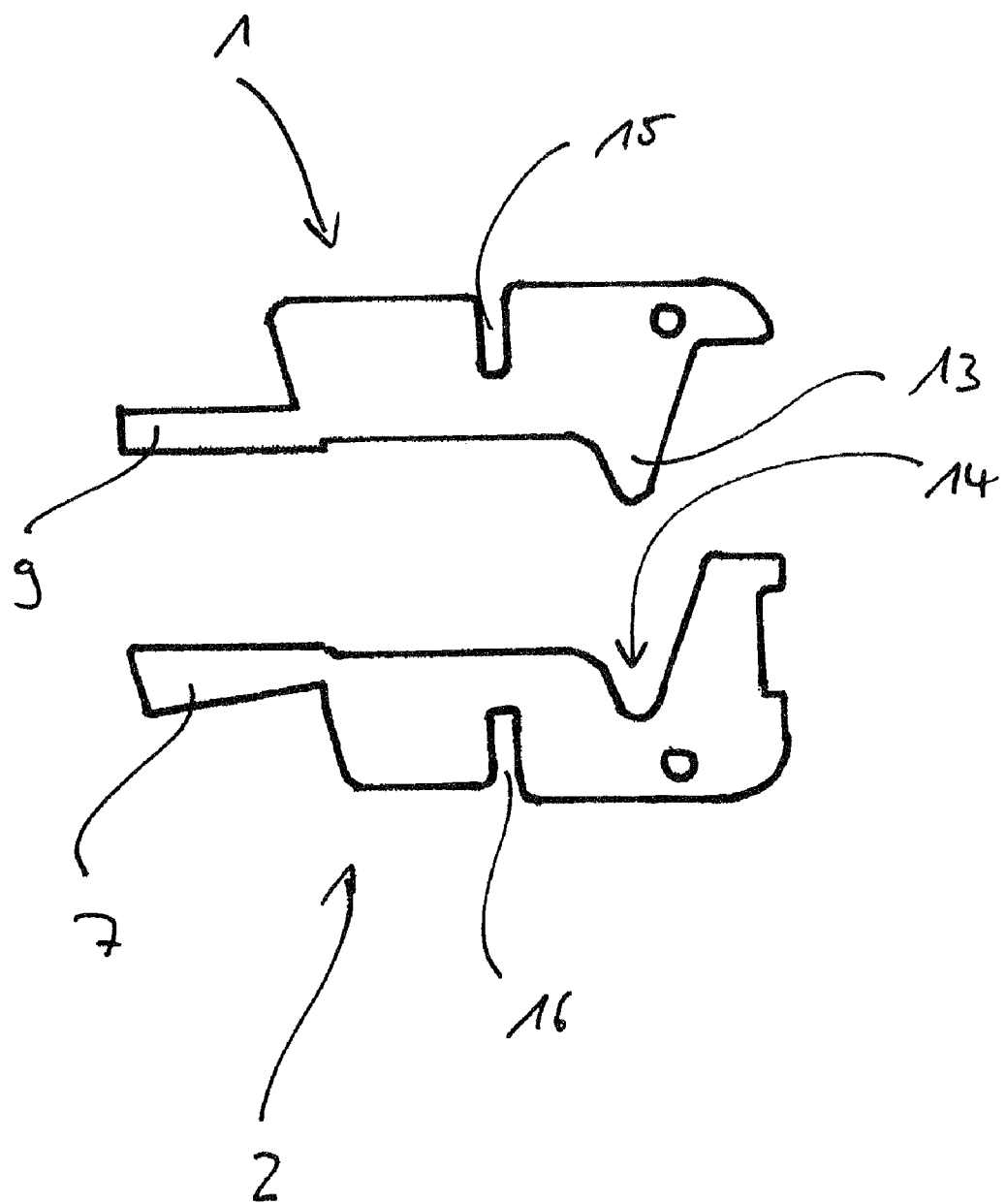

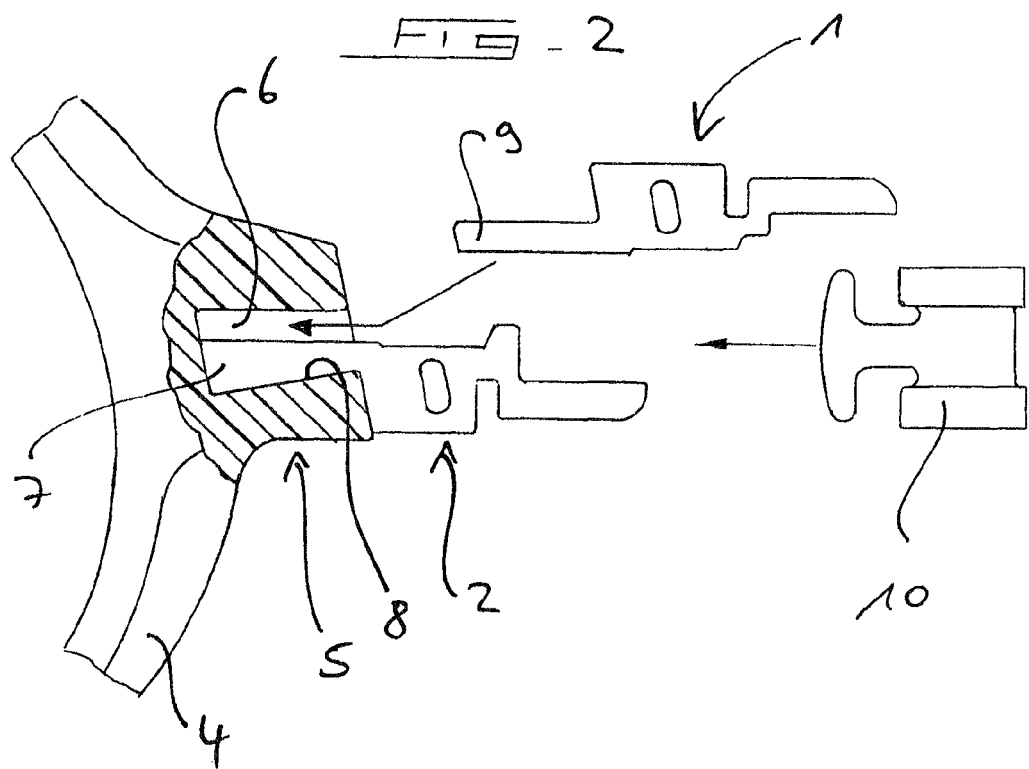
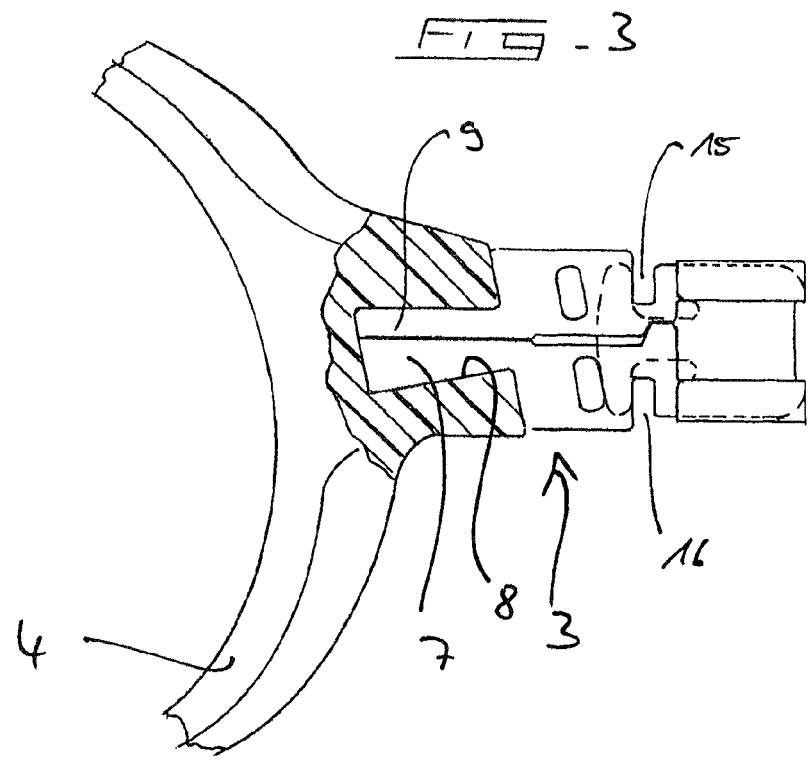

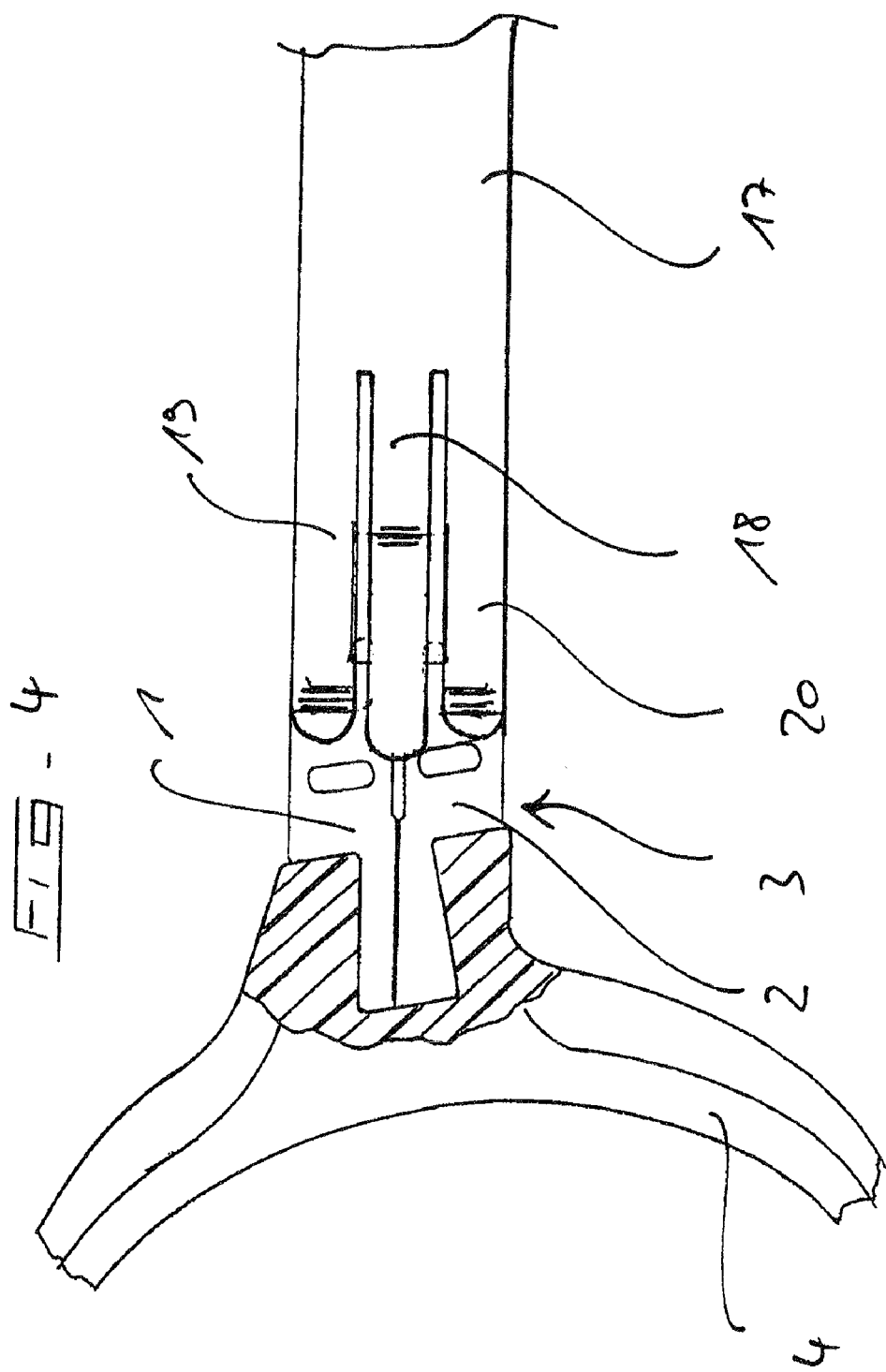

EYEGLASS FRAME

CROSS-REFERENCE TO RELATED APPLICATIONS

This application is a continuation of International Application PCT/EP2008/003193, with an international filing date of Apr. 21, 2008, which claims the benefit of German Patent Application No. 20 2007 005 735.0 filed Apr. 20, 2007, which are fully incorporated herein by reference.

FIELD

The present invention relates to an eyeglass frame, in particular an eyeglass frame with a screw-free hinge mechanism.

BACKGROUND

From the prior art, countless eyeglass frames are known which use different types of joint mechanisms. The most common variant is based on a hinge mechanism where pins are arranged on the frame and/or the mount which cooperate with a corresponding joint part which is arranged on the mount-side end of the temple, wherein the two parts are pushed together and are rotatably-connected by means of special screws. With most frames, especially those which are to be used with corrective lenses, the opening and closing of the mount takes place by means of a so-called locking block. It is also conceivable that lenses are directly attached to a frame, where screws are directly screwed into the lens. In the case of frameless eyeglasses, the temples are screwed directly into the lenses via an extension piece.

Since the pivot joint represents the most dynamically stressed component of an eyeglass frame, several solutions have done away with a conventional pivot joint for simplicity reasons.

For example, U.S. Pat. No. 3,155,982 proposes a pair of eyeglasses, in which the eyeglass temples interact directly with the front part of the mount holding the lenses. For this, the mount-side end of the temple is divided into three leaf springs, wherein the middle leaf spring abuts the outer edge of the mount part, whereby the two outer leaf springs are using hooks formed at their ends, which engage in openings which are arranged in the main part near to the outer edge.

A similar mechanism is known from the French Patent No. 1009345. In the eyeglass frame disclosed there, the temples are similarly divided into three leaf springs on the ends which taper on the mount. On the mount itself, a U-shaped extension piece is provided on the left and right, the central part of which forms a joint, in which the end bent into the shape of a hook engages the middle of the three leaf springs. The two outer leaf springs run straight along their entire length wherein, when the temples are unfolded, their ends abut with the side surfaces on the side of the extension piece turned away from the wearer and with the front faces on the surface of the eyeglass mount facing the wearer, whereby the temples are stabilised in an unfolded state.

A simpler design is proposed in European Patent No. 0 863 424 B1, which integrates the solution related to the joint connection which is already integrated in the frame and/or the mount and which adopts the principle of a temple which is provided with three leaf springs. A connection element is provided on the mount, on the left and right hand side respectively. This comprises an upper and a lower recess which constitutes a joint axis running perpendicular to the direction of the unfolded temple. When the temples are unfolded, the outer leaf springs abut the surface of the connecting element which is facing the wearer and clamp the recesses in the connecting element with bends which are provided on their free ends. At the same time, the middle leaf spring abuts the opposite surface of the connecting element. Thus, in a simple way, a joint is created which engages the mount directly and does away with conventional types of connections such as screws. In so doing, the connecting element is divided into two so as to allow easy replacement of the lenses. All component parts of such eyeglasses are made of sheet metal. This mechanism, however, is afflicted with the disadvantage that the mount and/or the frame must be made of the same material as the connecting elements, as these connection elements are integrally connected to the frame.

From the German patent application No. 10 2005 019 850 A1, an eyeglass frame is known of, in which in each case, a receiving element is provided on both sides of the frame which is fully embraced by two clips of a connecting element for the temple, wherein the clips are received in corresponding grooves which are provided on the outer surfaces of the receiving element.

SUMMARY

Proceeding from this, the object of the present invention is to further form a connection between a frame and the temple of an eyeglass frame, which allows for easy assembly.

This problem is solved with an eyeglass frame with the features according to claim 1.

The basis of the invention lies in the fact that the receiving element comprises a recess which opens in the direction of the temple into which a connecting element is received, the temple-side end of which points in the direction of the temple when unfolded. When compared to the length of the temple, the end is relatively short and the temple is pivot-jointed upon it. The connecting element is comprised of at least two component parts, which are designed in such a way that these, in the assembled state and forming the connecting element, securely hold the connecting element against loss in the recess of the receiving element by mutually tensioning.

Here, tensioning means that when they are fully received and/or slid into the recess of the receiving element and, at the same time form the connecting element, the two component parts mutually prevent a relative movement towards one another in the recess. The connecting element formed once by the component parts can no longer be removed in its entirety from the recess of the receiving element.

For this purpose, the component parts can exercise a force upon each other or simply mutually block each other in their movements inside the recess and through this, secure the self-formed connecting element within the recess against loss.

In other words, in accordance with the invention, both the component parts of the connecting element on the one hand and the recess of the receiving element on the other hand are designed in such a way that the component parts cannot be removed simultaneously from the recess, but the component parts can only be individually and successively inserted and/or extracted.

The recess in the receiving element, which is preferably connected in one piece to the eyeglass frame, can for example be made by milling.

In an embodiment of the eyeglass frame according to the invention, the recess comprises at least one undercut upon which, when assembled, at least one component part of the connecting element abuts. The undercut is designed in such a way that the component part interacting with this part can not be extracted from the recess towards the temple.

For this, in a preferred embodiment, the connecting element comprises a first component part and a second component part, wherein the first component part comprises a shape on its end facing away from the temple which is formed in such a way that this abuts the undercut of the receiving element's recess in a way which allows the shape to complement it, and wherein, the second component part comprises a shape on its end facing away from the temple which is formed in such a way that, upon its insertion into the receiving element's recess, it applies tension to the first component part against the undercut and/or presses against it.

In a particular embodiment, the undercut is designed as a continuous run, especially wedge-shaped, wherein the recess widens in the opposite direction to the temple, on at least one side edge of its opening pointing towards the temple.

In a similar way then, the shape of frame-side end of the first component part is formed in such a way that abutting is enabled in a way which allows the shape to complement it, wherein apart from the positive lock (form closure) exacted through this, a non-positive lock (force closure) can also form the connection when the second component part is inserted into the recess.

In addition to the forces which the component parts exert on each other, the non-positive lock can also be effected in such a way that against to the connecting element joined together by the component parts, the recess comprises such tolerances in the dimensions that between the component parts and thus, the connecting element on one hand and the recess of the receiving element on the other, a defined force fit (press fit) can be formed.

In a further advantageous embodiment, at least one component part comprises additional fixation elements which cooperate with corresponding openings in the inner part of the receiving element's recess. Preferably, these are clamping or locking elements in the form of catches or ligaments which are provided on the component part and angled contrary to the direction of being slid in, so that they place a resistance against the extraction of the component part, however not the insertion.

Preferably, the component parts of the connecting element, as well as the temple of the eyeglass frame, are made from a flat metal sheet with a defined thickness. The recess in the receiving element then, has a corresponding width at a right angle to the eyeglass frame.

In a further embodiment, in order to form the connecting element as twist-resistant for reasons of stability on the one hand, and in order on the other hand, to provide mutual tensioning of the parts for attaching the connecting element as a supporting additional measure, a component part opposite the recess of the receiving element comprises at least a nose or a nose-like projection which is directed towards the component part, and the other component part, comprises at least an approximate shape-complementing space and/or a recess for receiving the nose which is designed in such a way that the parts are not movable relative to each other in the longitudinal direction of the temple when the component parts are fully received in the recess of the receiving element.

When inserting the second component part into the recess into which the first component part has already been inserted, this connection formed from the nose and open space will be simply bypassed so that the first component part and the second component part are bent at right angles to each other for a short period. Due to the design using sheet metal, this is possible without any further ado.

By the spring effect which is generated when being bent apart, the complete reception of the one component part first takes place into the receiving element's recess, the nose of which then moves back into the free space of the other component part which stabilises the connection between the component parts and in a twist-resistant manner, forms the connecting element for the articulated connection of the temple.

In accordance with the invention, the connection mechanism with the connecting element and the receiving element make it possible for the material of the frame on the one hand, and the material of the temple and the other connecting element on the other, to be selected differently so that they do not need to be matched with each other. While the temple and the connecting element can be made of metal, the eyeglass frame with integrally moulded receiving elements can be made of horn or acetate.

In order to give the connecting element made out of a flat material sufficient stability, in a further embodiment of the eyeglass frame according to the invention groove sections can be provided running vertically on the end of the receiving element in the direction of the temple, into which sections the component parts of the connecting element can at least be partially received.

The temple is jointed to the connecting element, wherein preferably a hinge mechanism is used for this which is known from the previously-mentioned European Patent No. 0 863 424 B1, to which reference is hereby expressly made.

For this, the first component part of the connecting element comprises a first recess and the second component part of the connecting element comprises a second recess which forms a hinge axis running perpendicular to the direction of the unfolded temple.

The tapering end of the temple on the receiving element is divided up into three mutually parallel leaf springs. When the eyeglass frame is assembled with the temples unfolded, a middle leaf spring is located with its free end abutting the surface of the connecting element turned away from of the eyeglass wearer which is formed in an assembled state from the component parts, wherein in the direction of their free ends, the outer leaf springs first abut the surface of the connecting element facing the eyeglass, then in each case, feed through the vertical recesses of the connecting element and ultimately come to abut the surface of the connecting element facing away from the eyeglass wearer. Ideally, the outer leaf springs comprise bends in the vicinity of their free ends which prevent the eyeglass from slipping out of the connecting element and stabilise the temple when the spectacle frame is in its folded state.

BRIEF DESCRIPTION OF THE DRAWINGS

The invention will now be illustrated further on the basis of the example embodiments shown in the accompanying drawings. The following is shown:

FIG. 1a illustrates the component parts of the connecting element in accordance with the invention in a first embodiment;

FIG. 1b illustrates the component parts of the connecting element in accordance with the invention in a second embodiment;

FIG. 2 is a schematic exploded view as a section, showing one side of a frame with a receiving element and a connecting element;

FIG. 3 is a schematic view as a section, showing the receiving element and the connecting element of FIG. 2 in an assembled state;

FIG. 4 is a schematic view of a section of a temple end which is hinge-mounted in the assembled connecting element.

DETAILED DESCRIPTION

Figure 5:
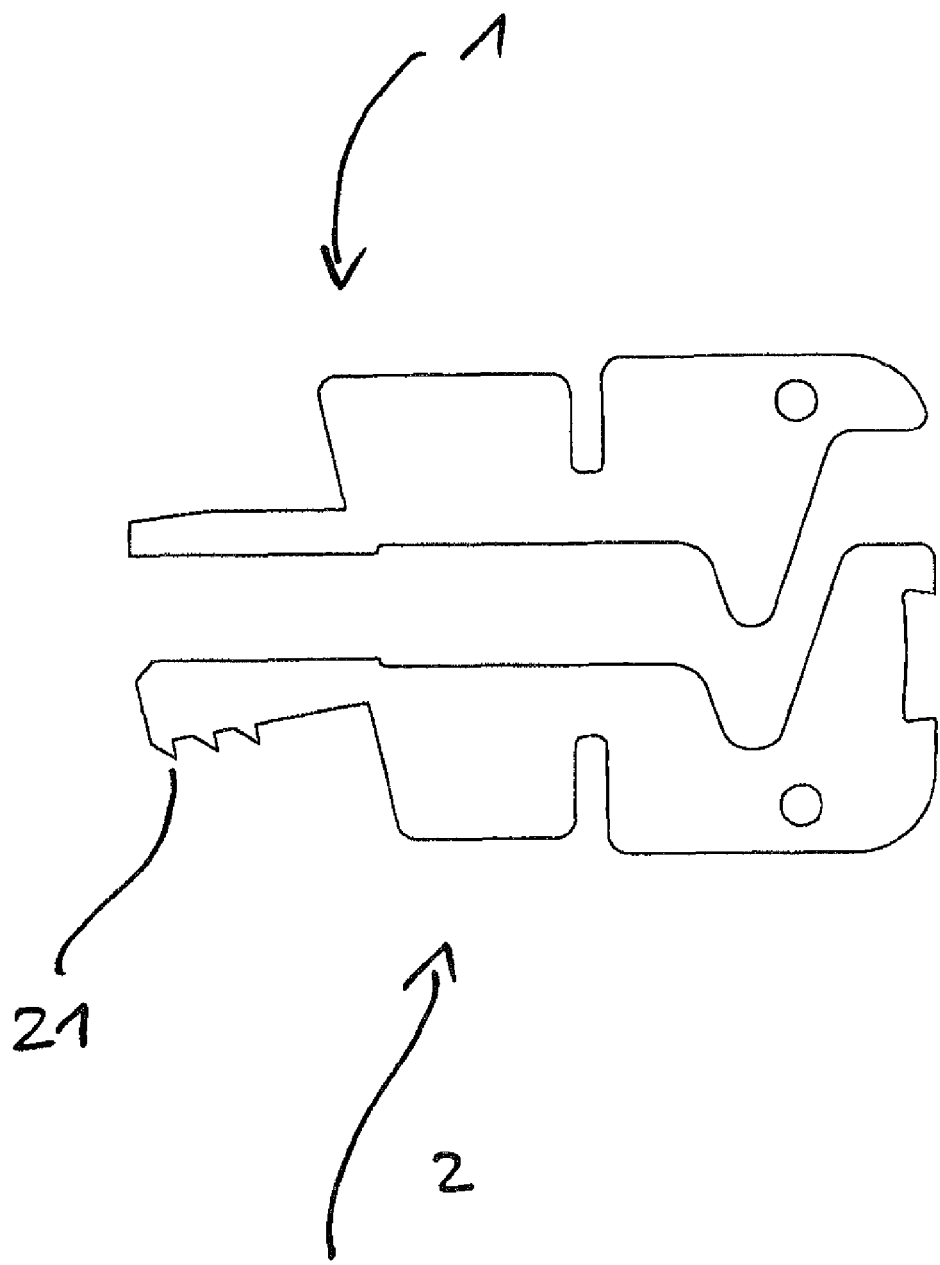
FIG. 5 illustrates as examples, the component parts in a further embodiment.

In FIGS. 1a and 1b examples are shown of the constituent parts of the connecting element for mounting a temple to an eyeglass frame in accordance with the invention.

As can be seen in FIGS. 2 and 3, in both embodiments, the connecting element consists of an upper component part 1 and a lower component part 2 which together form the connecting element 3 in an assembled state.

As a section, FIG. 2 shows one side of the eyeglass frame in accordance with the invention.

The eyeglass frame comprises a frame 4 which has on each of its sides a block-shaped receiving element 5 which is integrally moulded.

The receiving element 5 protrudes at a slight angle from the side of the frame 4 and preferably, can be prism shaped.

The receiving element 5 has a recess 6 which opens in the direction of an eyeglass temple (not shown here). The recess 6 can for example, be formed by milling or casting in the receiving element 5.

The recess 6 serves the job of receiving the connecting element 3, which is formed from the upper component part 1 and the lower component part 2.

The lower component part 2 comprises a nose 7 which widens in a wedge shape and which is faced away from the temple. In order to form a shape-complementing connection the recess 6 comprises a lower wedge-shaped widening edge 8 in a corresponding way which forms an undercut in the recess 6, as seen in the direction of the temple. When the connecting element 3 is assembled, the nose 7 comes to abut this edge 8.

As is shown in FIG. 2, the lower component part 2 is received in the recess 6 first of all. Thereafter, as is shown in FIG. 3, the upper component part 1 is pushed into the recess 6 with a straight nose 9.

In connection with this, the upper component part 1 tenses with the lower component part 2 in the recess 6 in such a way that the lower component part 2 is held at the edge 8 of this recess 6 forming the undercut, which additionally leads to the fact that in all, the connecting element 3 is secured against loss in the receiving element 5 of the frame 4.

For further stabilisation, a sleeve 10 can be slid onto the side of component parts 1 and 2, facing away from the frame 4.

The connecting element 3 is made from a flat material such as sheet metal, and preferably made from the same material as the temple.

Thus, in accordance with the invention, tension supporting the holder of the connecting element 6 between the upper component part 1 and the lower component part 2 is further effected such that in one embodiment, the lower component part 2 comprises a nose 11 pointing to the upper component part 1 which is received in a recess 12 of the upper component part 1 (FIG. 1a) or that in another embodiment, the upper component part 1 comprises a nose 13 pointing to the lower component part 2 which is received in a recess 14 of the lower part 2 (FIG. 1b).

In both cases, the connections from the noses 11 and/or 13 and recesses 12 and/or 14, together with the undercut in the recess 6 of the receiving element 5, form a resistance against the extraction of parts 1 and 2 in the direction of the temple. In accordance with the embodiment according to the invention, this is only possible, just like for the insertion of parts 1 and 2, by the fact that component parts 1 and 2 are bent against each other at right angles to their longitudinal direction during insertion and/or extraction.

As is shown in the FIGS. 1 to 4, the upper component part 1 comprises an upper recess 15 and in a similar manner, the lower component part 2 comprises a lower recess 16 which are arranged in a vertical alignment in order to form a joint axis.

In turn a temple 17 comprises three mutually parallel leaf springs on its end which is directed to the frame 4, a middle leaf spring 18 and two outer leaf springs 19 and 20.

As shown in FIG. 4, the outer leaf springs 19 and 20 abut the surface of the connecting element 3 which is facing the wearer and which, when assembled, is formed by the component parts 1 and 2 and then clamp down on recesses 15 and 16 and come to abut the surface of the connecting element 3 facing away from the eyeglass wearer, while the middle leaf spring 18 abuts the surface of the connecting element 3 facing away from the eyeglass wearer.

The temple 17 can be pivoted in a simple manner, wherein the recesses 15 and 16 form the joint axis and the surface of the connecting element 3 which faces away from the wearer as a counter bearing for the middle leaf spring 18 serves to form a spring action when pivoting.

FIG. 5 shows the two component parts in a modified version. In so doing, the lower component part 2 is comprised of three noses and/or hooks 21 arranged in a row which face backwards, i.e. directed against the direction of insertion.

These noses 21 can cooperate with corresponding openings in the recess 6 of the receiving element 5, into which these essentially engage in a shape-complementary fashion. Alternatively, these noses 21, which have a significant higher strength than the material of receiving element 5, are simply pressed into these if the material of the receiving element 5, for example, is heated, and as the case may be, with the aid of the resistance exercised by the first component part 1 when assembling. The noses 21 lead to a further stabilisation of the connecting element 3 in the receiving element 5 and prevent the extraction of the component part 2.

The invention claimed is:

1. An eyeglass frame comprising:
   a temple each on left and right sides;
   a frame comprising a receiving element each on the left and right sides for attaching the temple, wherein the receiving element comprises a recess opening in a direction towards the temple; and
   a connecting element configured to be located in said recess of each said receiving element, wherein a temple-side end of the connecting element points in the direction of the respective temple when the temple is in an unfolded state and wherein the temple side end is relatively short compared to a length of the temple, the temple-side end being coupled to the temple such that the temple is pivot-jointed, the connecting element comprising:
   at least two individual component parts configured to, in an assembled state forming the connecting element, securely hold the connecting element within the recess of the receiving element by mutually tensioning;
   wherein the recess of the receiving element comprises an undercut, wherein at least one of the component parts abuts the undercut of the recess when assembled.

2. An eyeglass frame in accordance with claim 1, wherein the connecting element comprises:
   a first component part; and
   a second component part coupled to the first component part;

wherein the first component part comprises a first end with a shape configured to abut the undercut of the recess complimentary to the undercut; and wherein, the second component part comprises a second end with a shape configured to apply tension to the first component part against the undercut upon insertion into the recess.

3. An eyeglass frame in accordance with claim 2, wherein the ends of the component parts form a press fit with the recess of the receiving element.

4. An eyeglass frame in accordance with claim 2, wherein the first component part comprises a first recess and the second component part comprises a second recess, the first and second recesses being arranged in a vertical alignment when the first and second component parts are assembled within the recess of the receiving element, the first and second recesses forming a joint axis.

5. An eyeglass frame in accordance with claim 4, wherein the temple has a mount-side end defining a middle leaf spring positioned between two mutually parallel outer leaf springs, each of the leaf springs having a free end wherein, when the temple is in the unfolded state, a free end of the middle leaf spring abuts an outer surface of the connecting element and the two outer leaf springs abut an inner surface of the connecting element and fed through the first and second recesses of the first and second component parts, respectively, such that the free ends of the two outer leaf springs abut the outer surface of the connecting element.

6. An eyeglass frame in accordance with claim 2, wherein the recess widens forming a wedge-shaped section in an opposite direction to the temple and on at least one side edge of a recess opening pointing towards the temple.

7. An eyeglass frame in accordance with claim 6, wherein the at least two individual component parts of the connecting element comprise a flat metal sheet.

8. An eyeglass frame in accordance with claim 7, wherein the ends of the component parts form a press fit with the recess of the receiving element.

9. An eyeglass frame in accordance with claim 8, wherein at least one of the component parts comprises fixing elements configured to prevent the component parts from being extracted from the recess.

10. An eyeglass frame in accordance with claim 1, wherein the recess widens forming a wedge-shaped section in an opposite direction to the temple and on at least one side edge of a recess opening pointing towards the temple.

11. An eyeglass frame in accordance with claim 1, wherein the at least two individual component parts of the connecting element comprise a flat metal sheet.

12. An eyeglass frame in accordance with claim 1, wherein one of the at least two individual component parts comprises at least a nose and the other of the at least two individual component parts comprises at least a recess configured to receive the nose when the at least two individual component parts are assembled within the recess of the receiving element, wherein the nose and the recess of the component parts are configured to prevent movement of the at least two individual component parts relative to each other in the longitudinal direction of the temple.

13. An eyeglass frame in accordance with claim 1, wherein at least one of the component parts comprises fixing elements configured to prevent the component parts from being extracted from the recess.

14. An eyeglass frame in accordance with claim 1, wherein a sleeve is slid over at least a portion of the connecting element.

15. An eyeglass frame in accordance with claim 1, wherein the receiving element is integrally molded with the frame.

* * * * *